United States Patent
Tokoro

(10) Patent No.: US 7,835,688 B2
(45) Date of Patent: *Nov. 16, 2010

(54) COMMUNICATION SYSTEM

(75) Inventor: Mario Tokoro, Tokyo (JP)

(73) Assignee: Sony Corporation, Tokyo (JP)

( * ) Notice: Subject to any disclaimer, the term of this patent is extended or adjusted under 35 U.S.C. 154(b) by 21 days.

This patent is subject to a terminal disclaimer.

(21) Appl. No.: 11/978,013

(22) Filed: Oct. 26, 2007

(65) Prior Publication Data

US 2008/0064392 A1 Mar. 13, 2008

Related U.S. Application Data

(63) Continuation of application No. 11/120,500, filed on May 3, 2005, now Pat. No. 7,319,886, which is a continuation of application No. 10/027,643, filed on Dec. 20, 2001, now Pat. No. 6,901,240, which is a continuation of application No. 09/252,057, filed on Feb. 17, 1999, now Pat. No. 6,349,324.

(30) Foreign Application Priority Data

Feb. 19, 1998 (JP) .............................. P10-037015

(51) Int. Cl.
H04M 1/00 (2006.01)
(52) U.S. Cl. .................... 455/3.03; 455/552.1; 709/200
(58) Field of Classification Search ................ 455/3.03, 455/552.1; 709/200
See application file for complete search history.

(56) References Cited

U.S. PATENT DOCUMENTS

| 4,450,319 A | 5/1984 | Lucey |
| 4,456,793 A | 6/1984 | Baker et al. |
| 5,054,051 A | 10/1991 | Hoff |
| 5,402,469 A | 3/1995 | Hopper et al. |
| 5,463,674 A | 10/1995 | Gillig et al. |
| 5,485,634 A | 1/1996 | Weiser et al. |
| 5,493,283 A | 2/1996 | Hopper et al. |
| 5,493,692 A | 2/1996 | Theimer et al. |
| 5,530,235 A | 6/1996 | Stefik et al. |
| 5,530,437 A | 6/1996 | Goldberg |
| 5,533,097 A | 7/1996 | Crane et al. |
| 5,544,321 A | 8/1996 | Theimer et al. |
| 5,548,814 A | 8/1996 | Lorang et al. |
| 5,555,376 A | 9/1996 | Theimer et al. |
| 5,603,054 A | 2/1997 | Theimer et al. |

(Continued)

FOREIGN PATENT DOCUMENTS

JP  A 1992 04-150444  5/1992

(Continued)

Primary Examiner—William D Cumming
(74) Attorney, Agent, or Firm—Frommer Lawrence & Haug LLP; William S. Frommer; Paul A. Levy

(57) ABSTRACT

In a communication of audio signals between first and second portable-telephone devices through a first portable-telephone base station, a second portable-telephone base station and a portable-telephone line network has been connected, IP addresses are exchanged. The IP addresses are required for communicating image data by first and second terminal adapters associated with the first and second portable-telephone devices respectively through an OCN. Image data is then transmitted to the IP addresses received in the communication through the OCN.

9 Claims, 14 Drawing Sheets

U.S. PATENT DOCUMENTS

| | | | |
|---|---|---|---|
| 5,611,038 A | 3/1997 | Shaw et al. | |
| 5,611,050 A | 3/1997 | Theimer et al. | |
| 5,675,629 A | 10/1997 | Raffel et al. | |
| 5,754,766 A | 5/1998 | Shaw et al. | |
| 5,771,352 A | 6/1998 | Nakamura et al. | |
| 5,794,139 A | 8/1998 | Mizikovsky et al. | |
| 5,832,378 A | 11/1998 | Zicker et al. | |
| 5,873,031 A | 2/1999 | Griffith et al. | |
| 5,898,919 A | 4/1999 | Yuen | |
| 5,905,865 A | 5/1999 | Palmer et al. | |
| 5,923,757 A | 7/1999 | Hocker et al. | |
| 5,930,368 A | 7/1999 | Hocker et al. | |
| 6,011,909 A | 1/2000 | Newlin | |
| 6,067,076 A | 5/2000 | Hocker et al. | |
| 6,069,896 A | 5/2000 | Borgstahl et al. | |
| 6,072,468 A | 6/2000 | Hocker et al. | |
| 6,073,034 A | 6/2000 | Jacobsen | |
| 6,147,986 A | 11/2000 | Orsic | |
| 6,151,490 A | 11/2000 | Schultheiss | |
| 6,195,548 B1 | 2/2001 | Schultheiss | |
| 6,263,503 B1 | 7/2001 | Margulis | |
| 6,334,046 B1 | 12/2001 | Philipson et al. | |
| 6,349,324 B1 * | 2/2002 | Tokoro | 709/200 |
| 6,363,246 B1 | 3/2002 | Williams et al. | |
| 6,421,347 B1 | 7/2002 | Borgstahl et al. | |
| 6,434,159 B1 | 8/2002 | Woodward et al. | |
| 6,445,913 B1 | 9/2002 | Ezuriko | |
| 6,487,408 B1 | 11/2002 | Tokuyoshi | |
| 6,501,939 B1 | 12/2002 | Dent | |
| 6,901,240 B2 * | 5/2005 | Tokoro | 455/3.03 |
| 7,319,886 B2 * | 1/2008 | Tokoro | 455/552.1 |

FOREIGN PATENT DOCUMENTS

| | | |
|---|---|---|
| JP | 5 327762 | 12/1993 |
| JP | 8 111693 | 4/1996 |
| JP | 8 140143 | 5/1996 |
| JP | A 1996 08-139798 | 5/1996 |
| JP | 9 64937 | 3/1997 |
| JP | 9 93175 | 4/1997 |
| JP | 9 321806 | 12/1997 |

* cited by examiner

F I G. 6

| PID | TAID | USAGE START DATE AND TIME | USAGE END DATE AND TIME | CUMULATED CHARGE | CREDIT-CARD NUMBER |
|---|---|---|---|---|---|
| | | | | | |

COMMUNICATION SYSTEM

This application is a continuation of U.S. application Ser. No. 11/120,500, filed May 3, 2005, now U.S. Pat. No. 7,319,886 which is a continuation of U.S. application Ser. No. 10/027,643 filed Dec. 20, 2001 (now U.S. Pat. No. 6,901,240), which is a continuation of U.S. application Ser. No. 09/252,057 filed Feb. 17, 1999 (now U.S. Pat. No. 6,349,324), each of which are incorporated by reference herein.

BACKGROUND OF THE INVENTION

In general, the present invention relates to a communication system, more particularly, relates to a communication system that allows the communication to be switched to the so-called television telephone with ease during a telephone conversation dependent on the voice of the conversation partner.

An ordinary telephone set only allows a voice telephone conversation with a partner. With a television-telephone set, however, the user can have a telephone conversation with a partner looking at an image of the partner. In addition, by connecting a video camera to a personal computer, the user can also have a telephone conversation with a partner through the Internet looking at an image of the partner as is the case with a television-telephone set.

In order to have a telephone conversation with a partner while looking at an image of the partner by using a television-telephone set or to have a telephone conversation with a partner through the Internet looking at an image of the partner by connecting a video camera to a personal computer, however, it is necessary for the user to be present in a particular room, a fixed place or the like where the television-telephone set or the personal computer is placed. That is to say, there is a problem that the user is not capable of having a telephone conversation with a partner while looking at an image of the partner with ease when the user is not present at the particular room or he is out.

As a possible solution to the problem described above, that is, in order to make the television telephone usable at any place, the function of a portable telephone device which is widely used at the present time is extended so that the portable telephone device may be functioning as a television-telephone set.

In this case, however, it is necessary to incorporate components such as a CCD camera, a liquid crystal display device and an image compressing/decompressing circuit in the body of the portable telephone device itself. As a result, the portability inherent in the portable telephone device is lost substantially due to causes such as an increase in device size, an increase in device weight and a decrease in battery life.

In stores selling home electrical appliances, on the another hand, a large number of television receivers and VTRs of the integrated-camera type are displayed and there is adopted an exhibition technique of displaying images of customers visiting the stores taken by cameras and broadcasted television programs by the television receivers all the time. If the equipments for taking and displaying these images can be combined with the portable telephone device carried by the user, to implement a television-telephone set, the user is able to use a television-telephone set at any place by only visiting for example any of stores selling home electrical appliances which exist in a wide region without losing the portability of the potable telephone device itself.

SUMMARY OF THE INVENTION

It is thus an object of the present invention addressing the problems described above to provide a communication apparatus having a simple configuration and a low cost such as a portable telephone device for use by the user to have the traditional voice telephone conversation with a partner wherein an extended function for implementing the function of a television-telephone set allowing the user to have a conversation with a partner looking at an image of the partner available by merely adding a minimum facility to the communication apparatus such as a portable telephone device.

According to an invention, a total communication system includes a first communication device which can communicate with another first communication device by using a first communication system and a second communication device which can communicate with another second communication device by using a second communication system, the first communication device comprising:

a first communication means for communicating with the another first communication device by using the first communication system;

a second communication means for communicating with the second communication device located in close proximity to the first communication device by using a third communication system; and a first control means for controlling the first and second communication means;

the second communication device comprising:

a third communication means for communicating with the another second communication device by using the second communication system;

a forth communication means for communicating with the first communication device located in close proximity to the second communication device by using the third communication system; and a second control means for controlling the third and forth communication means;

the first control means of the first communication device controlling the first and second communication means;

wherein the first communication device receives address information of the second communication device from the second communication device located in close proximity by using the third communication system;

the first communication device transmits, using the first communication system, the address information received from the second communication device to the another first communication device communicated with the first communication device by using the first communication system; and the first communication device receives the address information of the another second communication device from the another first communication device by using the first communication system;

According to an invention, a first communication device is employed in a total communication system comprising a first communication device which can communicate with another first communication device by using a first communication system and the second communication device which can communicate with another second communication device by using a second communication system, the first communication device comprising:

a first communication means for communicating with the another first communication device by using the first communication system;

a second communication means for communicating with the second communication device located in close proximity to the first communication device by using a third communication system; and a control means for controlling the first communication means and the second communication means to receive address information of the second communication device from the second communication device located in close proximity to the first communication device by using the third communication system, to transmit the address information received from the second communication device to the another first communication device communicated with the first communication device by using the first communication system, and to receive address information of the another second communication device from the another first communication device by using the first communication system.

According to an invention, a second communication device is employed in a total communication system comprising a first communication device which can communicate with another first communication device by using a first communication system and the second communication device which can communicate with another second communication device by using a second communication system, the second communication device comprising:

a third communication means for communicating with the another second communication device by using the second communication system;

a forth communication means for communicating with the first communication device located in close proximity to the second communication device by using a third communication system; and a control means for controlling the forth communication means to transmit address information of the second communication device to the first communication device and for controlling the third communication means to receive address information of the another first communication device and address information of the another second communication device from the another second communication device.

According to an invention, a communication method using a total communication system includes a first communication device which can communicate with another first communication device by using a first communication system and a second communication device which can communicate with another second communication device by using a second communication system, the communication method comprising the steps of:

receiving address information of the second communication device from the second communication device located in close proximity to the first communication device to the first communication device by using a third communication system;

transmitting the address information received from the second communication device from the first communication device by using the first communication system to the another first communication device by using the first communication system; and receiving the address information of the second communication device transmitted from the another first communication device, by using the third communication system.

BRIEF DESCRIPTION OF THE DRAWINGS

FIG. 6 is a diagram showing a typical data structure of a user control table used in the authentication/accounting server 235 shown in FIG. 5;

DETAILED DESCRIPTION OF THE PREFERRED EMBODIMENT

The present invention will become apparent from the following detailed description of a preferred embodiment with reference to the accompanying diagrams.

Figure 1:
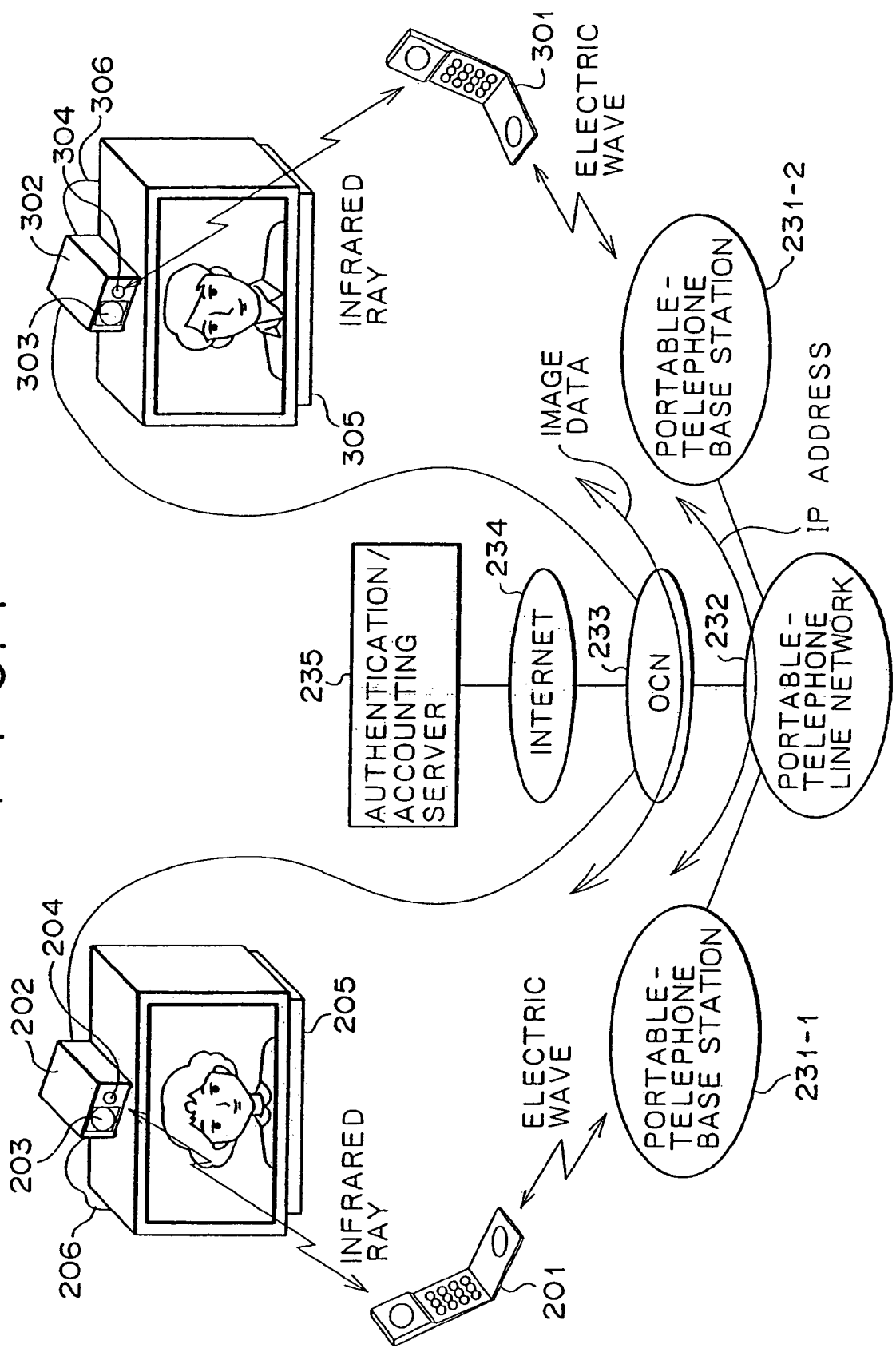
FIG. 1 is a diagram showing a typical configuration of a communication system provided by the present invention.

FIG. 1 is a diagram showing a typical configuration of a communication system provided by the present invention. In this typical configuration, a portable telephone device 201 is capable of communicating with a closest portable-telephone base station 231-1 by using an electric wave. The portable-telephone base station 231-1 is connected to another portable-telephone base station 231-2 through a portable-telephone line network 232. The portable-telephone base station 231-2 is capable of communicating with another potable telephone device 301 by using an electric wave.

In addition, the portable telephone device 201 is capable of communicating with an infrared-ray communication unit 204 of a terminal adapter 202 by using an infrared ray. The terminal adapter 202 is provided with a video camera 203 for taking an image of the user of the portable telephone device 201 and installing the image inside the terminal adapter 202. The terminal adapter 202 is connected to a television receiver 205 by an IEEE1394 high-speed serial bus 206 which is referred to hereafter simply as a 1394 bus. The television receiver 205 is capable of displaying the image of the user of the portable telephone device 301 supplied thereto by the terminal adapter 202.

The terminal adapter 202 is connected to another terminal adapter 302 through an OCN (Open Computer Network) 233.

Much like the terminal adapter 202, this terminal adapter 302 has an infrared-ray communication unit 304 and a video camera 303 and is thus capable of communicating with the portable telephone device 301 by using an infrared ray and taking an image of the user of the portable telephone device 301. The terminal adapter 302 is connected to a television receiver 305 by a 1394 bus 306 and the television receiver 305 is capable of displaying the image of the user of the portable telephone device 201 supplied thereto by the terminal adapter 302.

The OCN 233 is a new network provided by NTT (Nippon Telegraph and Telephone) Corporation for rendering computer-communication services which started in the year of 1996. The computer-communication services provided by the OCN 233 include routing services based on the Internet protocol and Internet connection services. The services are best-effort services of a connectionless communication type suitable for computer communication.

The OCN 233 is connected to the Internet 234 which is also connected to an authentication/accounting server 235.

Figure 2:
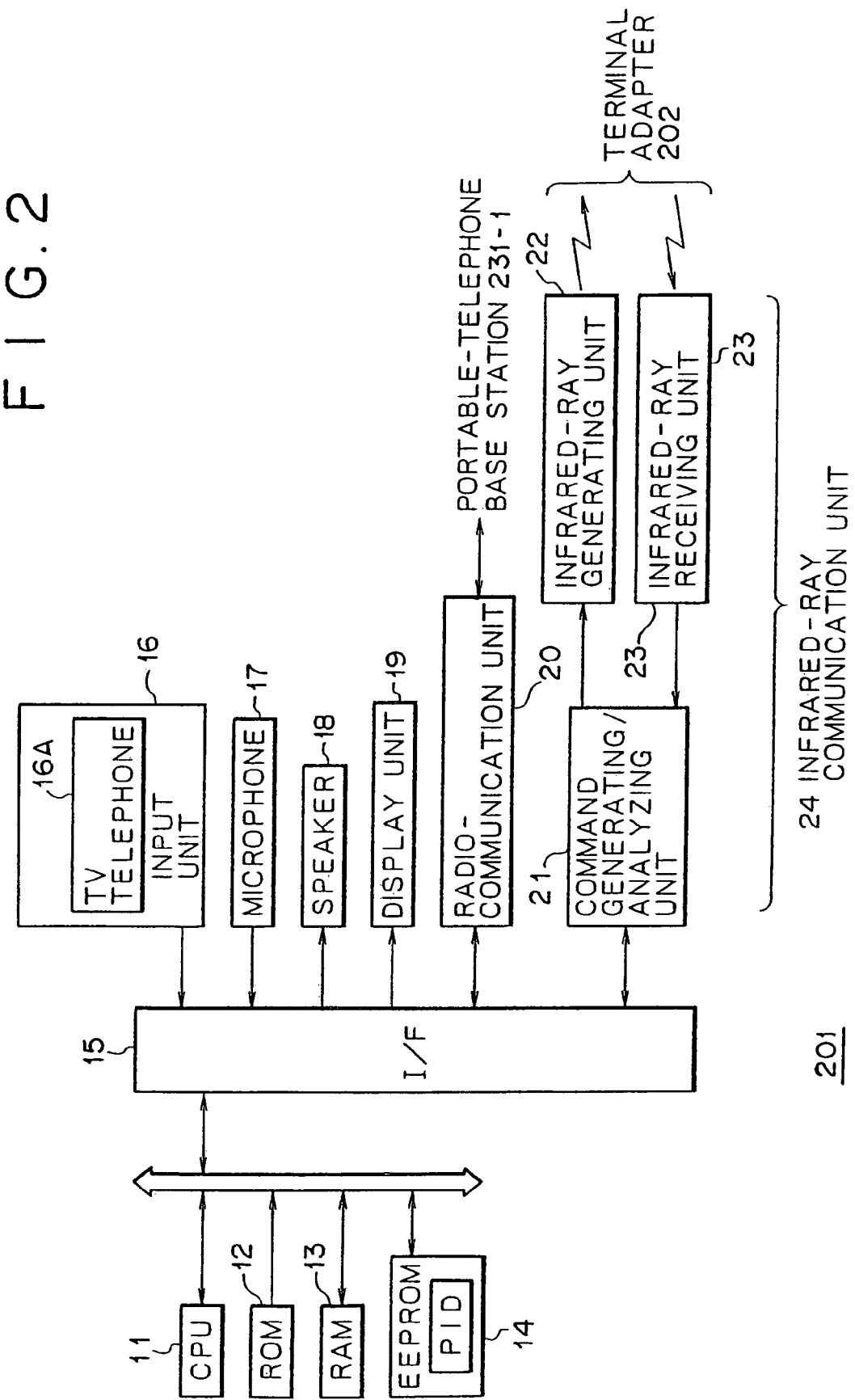
FIG. 2 is a block diagram showing a typical internal configuration of a portable telephone device 201 used in the communication system shown in FIG. 1.

FIG. 2 is a block diagram showing a typical configuration of the portable telephone device 201. Since the configuration of the portable telephone device 301 is the same as that of the portable telephone device 201, portable telephone device 301 is not shown in a figure.

A CPU 11 carries out various kinds of processing by execution of programs stored in a ROM 12. A RAM 13 is used for properly storing data and programs required by the CPU 11 in carrying out the processing. An EEPROM 14 is used for storing information for uniquely identifying the owner of the portable telephone device 201 such as a PID (personal ID).

An input unit 16 comprises the ten keys, a sharp key, an asterisk key and another keys as well as buttons used by the user for entering commands to request the CPU 11 to carry out various kinds of processing. In particular, a television-telephone button 16A of the input unit 16 is operated by the user when it is desired to set the portable-telephone device 201 or 301 in a television-telephone mode. To put it in detail, this television-telephone button 16A is pressed in order to utilize an extended function of the portable-telephone device 201 or 301 allowing the user to use the portable-telephone device 201 or 301, which is normally used as an ordinary telephone terminal, as a television-telephone terminal. A microphone 17 picks up voice of the user whereas a speaker 18 outputs voice of a communication partner to the user. A display unit 19 is implemented typically by an LCD. A number or a symbol entered by the user by operating a key or a message generated by the portable-telephone device 201 or 301 appears on the display unit 19.

A radio-communication unit 20 carries out communication with the closest portable-telephone base station 231-1. An infrared-ray communication unit 24 comprises a command generating/analyzing unit 21, an infrared-ray generating unit 22 and an infrared-ray receiving unit 23. The infrared-ray generating unit 22 generates an infrared-ray signal corresponding to a command supplied thereto by the command generating/analyzing unit 21, transmitting the signal to the infrared-ray communication unit 204 of the terminal adapter 202. The infrared-ray receiving unit 23 receives an infrared-ray signal transmitted thereto by the infrared-ray communication unit 204 of the terminal adapter 202, passing the signal to the command generating/analyzing unit 21. On the another hand, the command generating/analyzing unit 21 generates a command according to an instruction issued by the CPU 11, outputting the command to the infrared-ray generating unit 22. In addition, the command generating/analyzing unit 21 analyzes a signal received from the infrared-ray receiving unit 23, supplying a result of the analysis to the CPU 11. An interface unit 15 carries out interface processing between the CPU 11 and components on the another side, that is, the input unit 16, the microphone 17, the speaker 18, the display unit 19, the radio-communication unit 20, the command generating/analyzing unit 21, the infrared-ray generating unit 22, the infrared-ray receiving unit 23, the infrared-ray communication unit 24.

Figure 3:
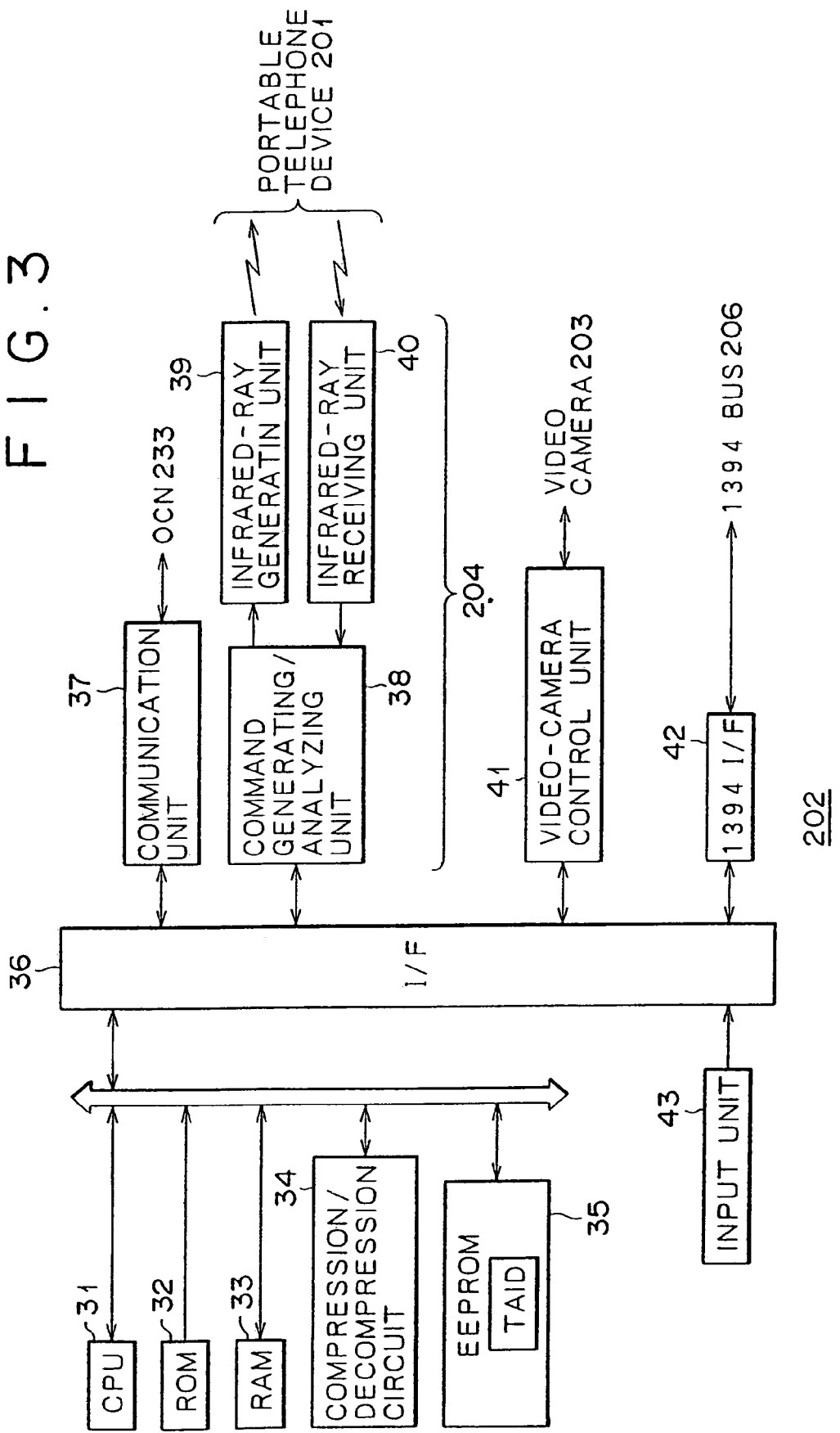
FIG. 3 is a block diagram showing a typical internal configuration of a terminal adapter 202 used in the communication system shown in FIG. 1.

FIG. 3 is a block diagram showing a typical configuration of the terminal adapter 202. It should be noted that, since the configuration of the terminal adapter 302 is the same as that of the adapter 202, the terminal adopter 302 is not shown in a figure.

A CPU 31 carries out various kinds of processing by execution of programs stored in a ROM 32. A RAM 33 is used for properly storing data and programs required by the CPU 31 in carrying out the processing. A compression/decompression circuit 34 compresses and decompresses video and audio data. An EEPROM 35 is used for storing information such as a TAID (terminal ID) of the terminal adapter 202.

A communication unit 37 carries out communication with the OCN 233. An infrared-ray communication unit 204 comprises a command generating/analyzing unit 38, an infrared-ray generating unit 39 and an infrared-ray receiving unit 40. The command generating/analyzing unit 38 generates a command according to an instruction issued by the CPU 31, outputting the command to the infrared-ray generating unit 39. The infrared-ray generating unit 39 generates an infrared-ray signal corresponding to a command supplied thereto by the command generating/analyzing unit 38, transmitting the signal to the infrared-ray communication unit 24 of the portable-telephone device 201. On the another hand, the infrared-ray receiving unit 40 receives an infrared-ray signal transmitted thereto by the infrared-ray communication unit 24 of the portable-telephone device 201, passing the signal to the command generating/analyzing unit 38. In addition, the command generating/analyzing unit 21 analyzes the signal received from the infrared-ray receiving 40, supplying a result of the analysis to the CPU 31.

A video-camera control unit 41 controls the video camera 203 to take an image of the user and outputs the image to the compression/decompression circuit 34. A 1394-interface unit 42 carries out interface processing between the CPU 31 and the 1394 bus 206. An input unit 43 is operated by the user for entering a variety of commands. An interface unit 36 carries out interface processing between the CPU 31 and the communication unit 37, the command generating/analyzing unit 38, the infrared-ray generating unit 39, the infrared-ray receiving unit 40, the video-camera control unit 41, the 1394-interface unit 42 and the input unit 43.

Figure 4:
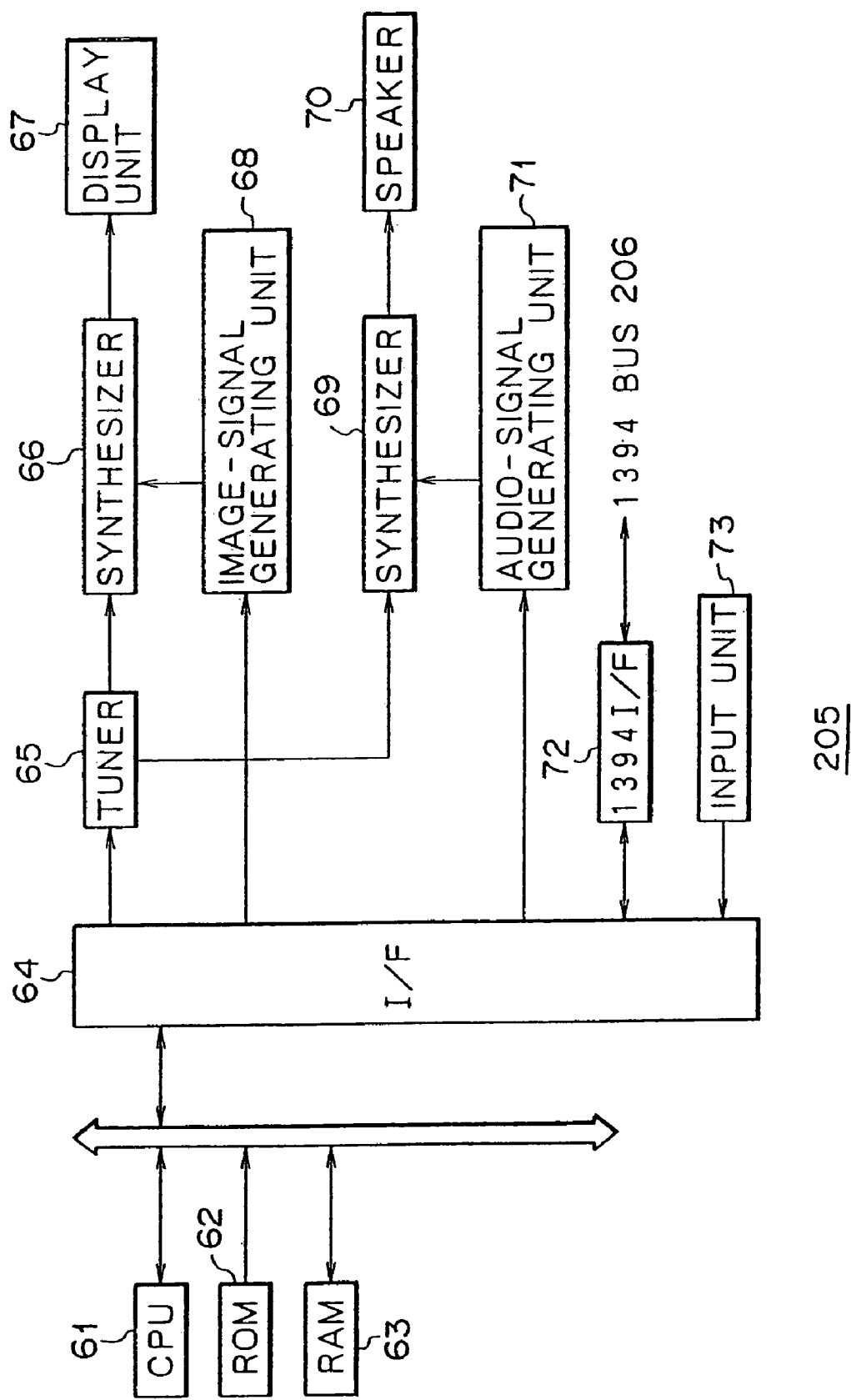
FIG. 4 is a block diagram showing a typical internal configuration of a television receiver 205 used in the communication system shown in FIG. 1.

FIG. 4 is a block diagram showing a typical configuration of the television receiver 205. It should be noted that, since the configuration of the television receiver 305 is the same as that of the television receiver 205, the television receiver 305 is not shown in a figure.

A CPU 61 carries out various kinds of processing by execution of programs stored in a ROM 62. A RAM 63 is used for properly storing data and programs required by the CPU 61 in carrying out the processing. Controlled by the CPU 61 through an interface unit 64, a tuner 65 receives an electric wave from a predetermined broadcasting station and outputs a video signal obtained as modulation of the electric wave to a display unit 67 by way of a synthesizer 66. The display unit 67 is implemented typically by a CRT. Controlled by the CPU 61 through the interface unit 64, a video-signal generating unit 68 generates a video signal and outputs the signal to the synthesizer 66 which synthesizes the video signal supplied thereto by the video-signal generating unit 68 and a video signal output by the tuner 65, outputting the synthesized signal to the display unit 67.

An audio signal output by the tuner 65 is supplied to a speaker 70 by way of a synthesizer 69. Controlled by the CPU 61 through the interface unit 64, an audio-signal generating unit 71 generates an audio signal and outputs the signal to the synthesizer 69 which synthesizes the audio signal supplied thereto by the audio signal generating unit 71 and an audio signal output by the tuner 65, outputting the synthesized signal to the speaker 70.

A 1394-interface unit 72 carries out interface processing between the CPU 61 and the 1394 bus 206. Composed of switches, buttons or a dedicated remote commander, an input unit 73 supplies a command entered by the user to the CPU 61 through the interface unit 64.

Figure 5:
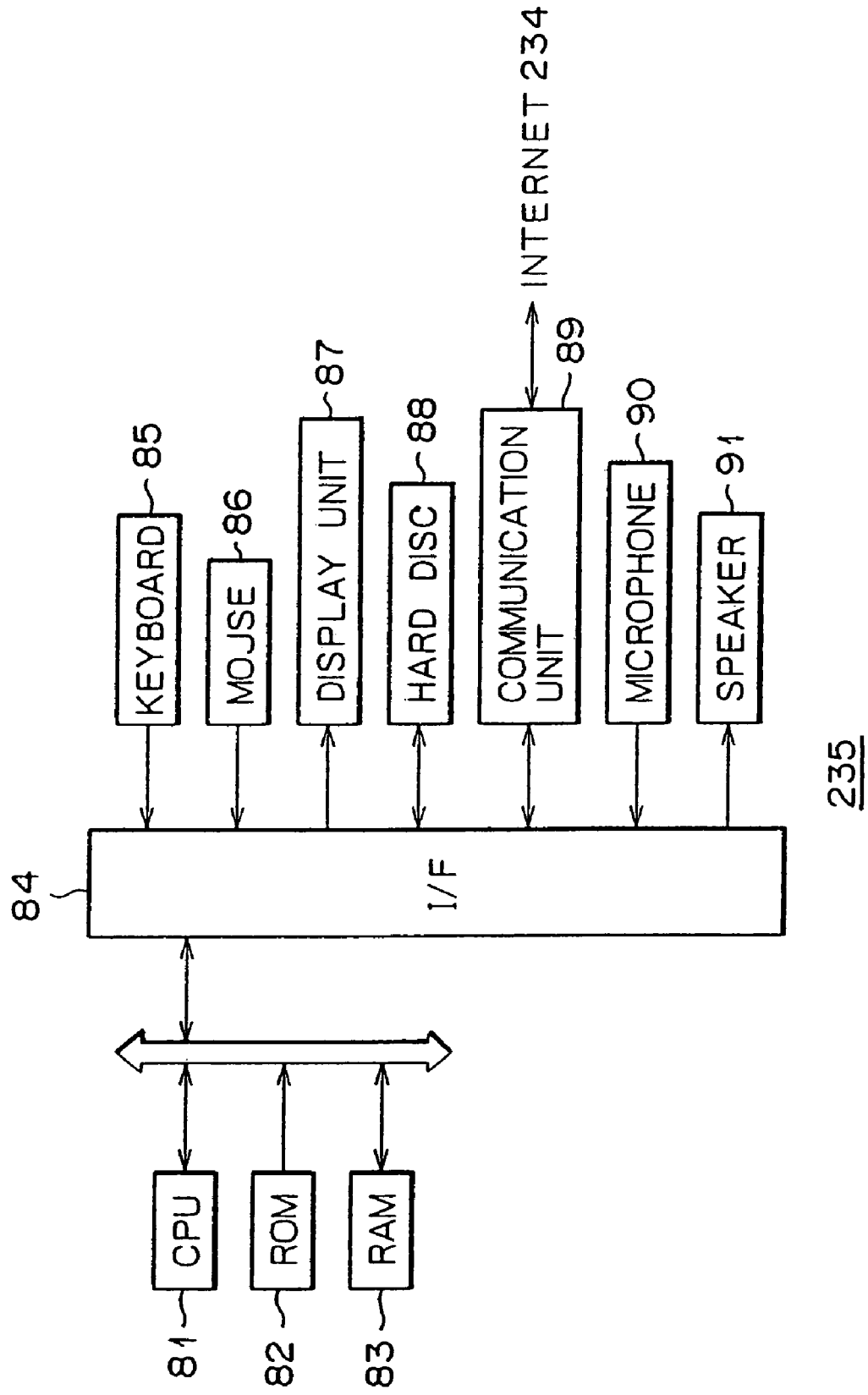
FIG. 5 is a block diagram showing a typical internal configuration of an authentication/accounting server 235 used in the communication system shown in FIG. 1.

FIG. 5 is a block diagram showing a typical configuration of the authentication/accounting server 235. A CPU 81 carries out various kinds of processing by execution of programs stored in a ROM 82. A RAM 83 is used for properly storing data and programs required by the CPU 81 in carrying out the processing. A keyboard 85 and a mouse 86 are operated by the user for entering a variety of commands. On a display unit 87, characters and images are properly displayed. A hard disc 88 is used for storing a user control table as shown in FIG. 6. Each row of the user control table comprises pieces of information including the personal ID (PID) of a portable-telephone device such as the portable-telephone device 201 or 301, the terminal ID (TAID) of a terminal adapter such as the terminal adapter 202 or 302, a usage start time and date of the television-telephone set to be described later, a usage end time and date of the television-telephone set also to be described later, a cumulated charge of using the television-telephone set and the number of a credit card to which the cumulated charge is to be billed. In addition, the hard disc 88 is also used for storing a communication history for each user in addition to the information required for authentication and accounting processing for telephone services rendered to the user.

A communication unit 89 carries out communication with the Internet 234. A microphone 90 picks up voice of the user and a speaker 91 outputs an audio signal to the user. An interface unit 84 carries out interface processing between the CPU 81 and the components; the keyboard 85, the mouse 86, the display unit 87, the hard disc 88, the communication unit 89, the microphone 90, and the speaker 91.

Figure 7:
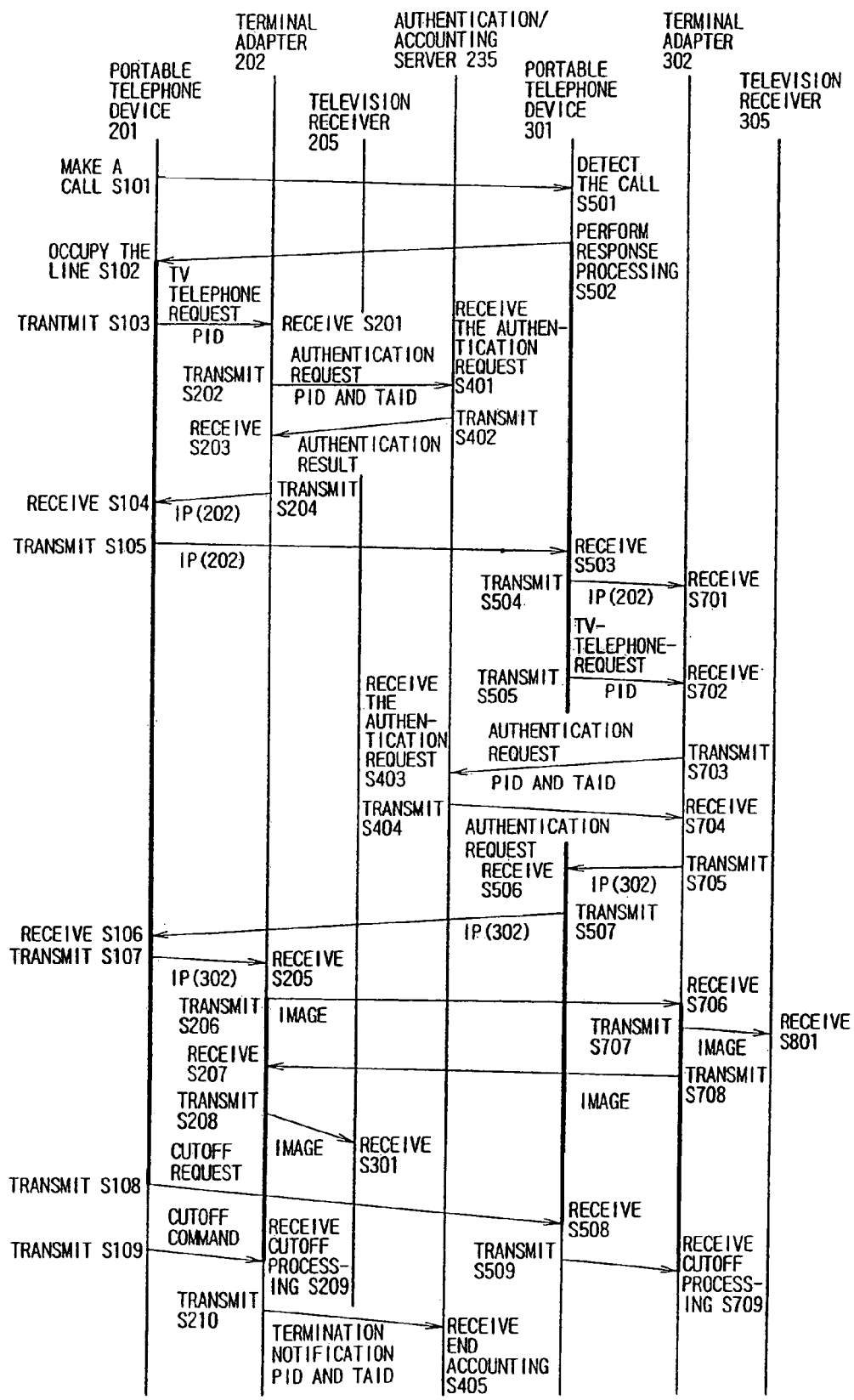
FIG. 7 is an explanatory diagram used for describing the operation of the communication system shown in FIG. 1.

Next, the operation of the communication system is explained referring to FIG. 7. As shown in the figure, the operation of the communication system begins with the step S101 at which the user of the portable-telephone device 201 operates the input unit of the portable-telephone device 201, entering the telephone number of the portable-telephone device 301 in order to call the portable-telephone device 301. When the telephone number of the portable-telephone device 301 and a command for starting transmission of a calling signal are entered by the input unit 16, the CPU 11 controls the radio-communication unit 20, and outputs an electric wave conveying the calling signal to the closest portable-television base station 231-1. Subsequently, the calling signal is transmitted from the portable-telephone base station 231-1 to the portable-telephone base station 231-2 through the portable-telephone line network 232. Then, an electric wave conveying the calling signal is transmitted by the portable-telephone base station 231-2 to the portable-telephone device 301.

The radio-communication unit 20 employed in the portable-telephone device 301 receives the calling signal, supplying the calling signal to the CPU 11. At a step S501, detecting such an incoming call, the CPU 11 controls the display unit 19 and the speaker 18. The display unit 19 displays characters or symbols indicating that a call has been received while the speaker 18 outputs an audio signal to notify the user of the incoming call. Being aware of the incoming call, the user of the portable-telephone device 301 operates a response button of the input unit 16 of the portable-telephone device 301 at a step S502 to generate a response to the incoming call.

The portable-telephone device 201 receives a response signal transmitted by the portable-telephone device 301 at a step S102, occupying a communication line between the portable-telephone devices 201 and 301. Thereafter, an audio signal picked up by the microphone 17 employed by the portable-telephone device 201 is supplied to the radio-communication unit 20 through the interface unit 15 in the portable-telephone device 201 and then transmitted by the radio-communication unit 20 along a path comprising the portable-telephone base station 231-1, the portable-telephone line network 232 and the portable-telephone base station 231-2 to the portable-telephone device 301 wherein the audio signal is output to the speaker 18 through the radio-communication unit 20 and the interface unit 15. By the same token, an audio signal picked up by the microphone 17 employed by the portable-telephone device 301 is supplied to the radio-communication unit 20 through the interface unit 15 in the portable-telephone device 301 and then transmitted by the radio-communication unit 20 along a path comprising the portable-telephone base station 231-2, the portable-telephone line network 232 and the portable-telephone base station 231-1 to the portable-telephone device 201 wherein the audio signal is output to the speaker 18 by way of the radio-communication unit 20 and the interface unit 15. In this way, an ordinary telephone conversation based on audio signals is thus possibly made between the users of the portable-telephone devices 201 and 301.

Next, when the user of the portable-telephone device 201 wants to switch the communication mode from the ordinary telephone conversation based only on audio signals to the so-called television-telephone conversation accompanied by transmission of images, the user operates the television-telephone button 16A of the portable-telephone device 201 at a step S103. At that time, the CPU 11 employed in the portable-telephone device 201 reads out a personal ID (which is abbreviated hereafter to a PID) of the portable-telephone device 201 from the EEPROM 14, outputting the PID to the command generating/analyzing unit 21 along with a request for a television-telephone connection. The PID and the request for a television-telephone connection are then transmitted to the terminal adapter 202 by the infrared-ray generating unit 22 by an infrared-ray signal.

When the infrared-ray receiving unit 40 employed in the terminal adapter 202 receives the infrared-ray signal transmitted by the portable-telephone device 201 at a step S201, a command conveyed by the signal from the infrared-ray receiving unit 40 is output to the command generating/analyzing unit 38 which analyzes the command and supplies a result of the analysis to the CPU 31 through the interface unit 36. Receiving the PID and the request for a television-telephone connection transmitted by the portable-telephone device 201 at a step S202, the CPU 31 controls the communication unit 37 through the interface unit 36 to make an access to the authentication/accounting server 235 through the OCN 233 and the Internet 234. In the access, the PID of the portable-telephone device 201 and a terminal ID (referred to hereafter as a TAID) of the terminal adapter 202 read out from the EEPROM 35 are transmitted to the authentication/accounting server 235 along with a request for authentication.

At a step S401, the authentication/accounting server 235 receives the request for authentication, the PID and the TAID transmitted by the terminal adapter 202 through the communication unit 89 employed in the server 235. The CPU 81 employed in the authentication/accounting server 235 judges whether or not the PID and the TAID are registered in the user control table of FIG. 6 stored in the hard disc 88 as IDs which can be authenticated, that is, judged to be valid IDs. If the PID and the TAID are registered in the user control table as valid IDs., the present time and date are cataloged in the user control table as a usage start time and date. At a step S402, the CPU 81 of the authentication/accounting server 235 transmits a result of authentication from the communication unit 89 to the communication unit 37 of the terminal adapter 202 through the Internet 234 and the OCN 233.

At a step S203, the CPU 31 of the terminal adapter 202 evaluates the result of authentication received from the communication unit 37. If the result of authentication indicates that the PID and TAID required for carrying out a television-telephone communication are valid, the CPU 31 reads out an IP address IP (202) of the terminal adapter 202 stored in the EEPROM 35 in advance and controls the command generating/analyzing unit 38 to transmit the IP address IP (202) to the portable-telephone device 201 through the infrared-ray generating unit 39 as an infrared-ray signal at a step S204.

At a step S104 the IP address IP (202) is received by the infrared-ray receiving unit 23 employed in the portable-telephone device 201 and pass the signal to the CPU 11 by the command generating/analyzing unit 21 by way of the interface unit 15.

If the result evaluated at the step S203 indicates that authentication required for carrying out a television-telephone communication is not obtained, on the another hand, the IP address IP (202) of the terminal adapter 202 itself is not transmitted to the portable-telephone device 201 at the step S204. If the CPU 11 employed in the portable-telephone device 201 does not receive the IP address from the terminal adapter 202 at the step S104 the CPU 11 judges that the television-telephone communication is not authenticated and therefore does not carry out subsequent processing for the television-telephone communication any more.

If the CPU 11 receives the IP address IP (202) from the terminal adapter 202 at the step S104 as described above, on the another hand, the CPU 11 judges that the television-telephone communication is properly authenticated and therefore enters a television-telephone mode to carry out subsequent processing for the television-telephone communication.

In this case, at a step S105, the CPU 11 employed in the portable-telephone device 201 controls the radio-communication unit 20 to transmit the IP address IP (202) of the terminal adapter 202 received at the step S104 to the radio-communication unit 20 employed in the portable-telephone device 301 through a path comprising the portable-telephone base station 231-1, the portable-telephone line network 232 and the portable-telephone base station 231-2.

The CPU 11 employed in the portable-telephone device 301 receives the IP address IP (202) at a step S503. At a step S504 the CPU 11 supplies the IP address IP (202) to the command generating/analyzing unit 21 which then transmits the IP address IP (202) to the terminal adapter 302 through the infrared-ray generating unit 22.

At a step S701, the infrared-ray receiving unit 40 employed in the terminal adapter 302 receives the IP address IP (202), passing a result of reception to the command generating/analyzing unit 38 which supplies the IP address IP (202) to the CPU 31 through the interface unit 36. As a result, the terminal adapter 302 is hereafter capable of transmitting an image signal to the terminal adapter 202, strictly speaking, to the received IP address IP (202), through the OCN 233.

Then, processing is carried out among the portable-telephone device 301, the terminal adapter 302 and the authentication/accounting server 235 as the processing carried out among the portable-telephone device 201, the terminal adapter 202 and the authentication/accounting server 235 as described above.

To put it in detail, if the user of the portable-telephone device 301 also wants to switch the communication mode from the ordinary telephone conversation based only on audio signals to the so-called television-telephone conversation accompanied by transmission of images, the user operates the television-telephone button 16A of the portable-telephone device 301 at a step S505. Since the portable-telephone device 301 has the same configuration as the portable-telephone device 201 shown in FIG. 2, the operation of the portable-telephone device 301 is described referring to FIG. 2. At this time, the CPU 11 employed in the portable-telephone device 301 reads out a personal ID (PID) of the portable-telephone device 301 from the EEPROM 14, outputting the PID to the command generating/analyzing unit 21 along with a request for a television-telephone connection. The PID and the request for a television-telephone connection are then transmitted to the terminal adapter 302 from the infrared-ray generating unit 22 as an infrared-ray signal.

When the infrared-ray receiving unit 40 employed in the terminal adapter 302 receives the infrared-ray signal transmitted by the portable-telephone device 301 at a step S702, a command conveyed by the signal is output to the command generating/analyzing unit 38. Since the terminal adapter 302 has the same configuration as the terminal adapter 202 shown in FIG. 3, the operation of the terminal adapter 302 is explained properly referring to FIG. 3. The command generating/analyzing unit 38 analyzes the command and supplies a result of the analysis to the CPU 31 through the interface unit 36. Receiving the PID and the request for a television-telephone connection transmitted by the portable-telephone device 301 at a step S703, the CPU 31 controls the communication unit 37 through the interface unit 36 to make an access to the authentication/accounting server 235 through the OCN 233 and the Internet 234. In the access, the PID of the portable-telephone device 301 and a terminal ID (TAID) of the terminal adapter 302 read out from the EEPROM 35 are transmitted to the authentication/accounting server 235 along with a request for authentication.

At a step S403, the authentication/accounting server 235 receives the request for authentication, the PID and the TAID transmitted by the terminal adapter 302 through the communication unit 89. The CPU 81 employed in the authentication/accounting server 235 judges whether or not the PID and the TAID are previously registered in the user control table of FIG. 6 stored in the hard disc 88 as IDs which can be authenticated, that is, judged to be valid IDs. If the PID and the TAID are registered in the user control table as valid IDs, the present time and date are cataloged in the user control table as a usage start time and date. At a step S404 the CPU 81 of the authentication/accounting server 235 transmits a result of authentication from the communication unit 89 to the communication unit 37 of the terminal adapter 302 through the Internet 234 and the OCN 233.

At a step S704 the CPU 31 of the terminal adapter 302 evaluates the result of authentication received from the communication unit 37. If the result of authentication indicates that the PID and TAID required for carrying out a television-telephone communication are valid, the CPU 31 reads out an IP address IP (302) of the terminal adapter 302 stored in the EEPROM 35 in advance and controls the command generating/analyzing unit 38 to transmit the IP address IP (302) to the portable-telephone device 301 through the infrared-ray generating unit 39 as an infrared-ray signal at a step S705.

At a step S506, the IP address IP (302) is received by the infrared-ray receiving unit 23 employed in the portable-telephone device 301 and passed the received signal to the CPU 11 by the command generating/analyzing unit 21 through the interface unit 15.

If the result evaluated at the step S704 indicates that authentication required for carrying out a television-telephone communication is not obtained, on the another hand, the IP address IP (302) of the terminal adapter 302 itself is not transmitted to the portable-telephone device 301 at the step S705. If the CPU 11 employed in the portable-telephone device 301 does not receive the IP address from the terminal adapter 302 at the step S506, the CPU 11 judges that the television-telephone communication is not authenticated and therefore does not carry out subsequent processing for the television-telephone communication any more.

If the CPU 11 receives the IP address IP (302) from the terminal adapter 302 at the step S506 as described above, on the another hand, the CPU 11 judges that the television-telephone communication is properly authenticated and therefore enters a television-telephone mode to carry out subsequent processing for the television-telephone communication.

In this case, at a step S507, the CPU 11 employed in the portable-telephone device 301 controls the radio-communication unit 20 to transmit the IP address IP (302) of the terminal adapter 302 received at the step S506 to the radio-communication unit 20 employed in the portable-telephone device 201 through a path comprising the portable-telephone base station 231-2, the portable-telephone line network 232 and the portable-telephone base station 231-1.

The CPU 11 employed in the portable-telephone device 201 receives the IP address IP (302) at a step S106. At a step S107, the CPU 11 supplies the IP address IP (302) to the command generating/analyzing unit 21 which then transmits the IP address IP (302) to the terminal adapter 202 by way of the infrared-ray generating unit 22.

At a step S205, the infrared-ray receiving unit 40 employed in the terminal adapter 202 receives the IP address IP (302), passing a result of reception to the command generating/analyzing unit 38 which supplies the IP address IP (302) to the CPU 31 through the interface unit 36. As a result, the terminal adapter 202 is hereafter capable of transmitting an image signal to the terminal adapter 302, strictly speaking, the received IP address IP (302), through the OCN 233.

It should be noted that a request to switch the communication mode to a television-telephone conversation can be made from either the portable-telephone device 201 or the portable-telephone device 301.

Next, at a step S206, the CPU 31 employed in the terminal adapter 202 controls the video-camera control unit 41 to supply image data picked up by the video camera 203 to the compression/decompression circuit 34 then, the compression/decompression circuit 34 compresses the image data supplied thereto, supplying the compressed data to the communication unit 37. Subsequently, the communication unit 37 transmits the image data to the terminal adapter 302 through the OCN 233.

At a step S706, the communication unit 37 employed in the terminal adapter 302 receives the image data, supplying the data to the compression/decompression circuit 34 then, the compression/decompression circuit 34 decompresses the image data supplied thereto, feeding the decompressed data to the CPU 31. At a step S707, the CPU 31 drives the 1394-interface unit 42 to transmit the image data decompressed by the compression/decompression circuit 34 to the television receiver 305 through the 1394 bus 306.

At a step S801, the 1394-interface unit 72 employed in the television receiver 305 receives the image data transmitted thereto through the 1394 bus 306, passing the data to the CPU 61. Then, the CPU 61 outputs the image data to the synthesizer 66 by way of the video-signal generating unit 68. Finally, the synthesizer 66 supplies the image data to the display unit 67 for displaying the image thereon. The power supply of the terminal adapter 302 and/or the television receiver 305 are forcibly turned on in case they are not turned on yet. As a result, an image of the user of the portable-telephone device 201 is displayed on the display unit 67 employed in the television receiver 305.

By the same token, at a step S708, the CPU 31 employed in the terminal adapter 302 controls the video-camera control unit 41 to supply the image data of the user of the personal-telephone device 301 picked up by the video camera 303 to the compression/decompression circuit 3 for then, the compression/decompression circuit 34 compresses the image data supplied thereto, supplying the compressed data to the communication unit 37. Subsequently, the communication unit 37 transmits the image data to the terminal adapter 202 through the OCN 233.

At a step S207, the communication unit 37 employed in the terminal adapter 202 receives the image data, supplying the data to the compression/decompression circuit 34 then, the compression/decompression circuit 34 decompresses the image data supplied thereto, supplying the decompressed data to the CPU 31. At a step S208, the CPU 31 drives the 1394-interface unit 42 to transmit the image data decompressed by the compression/decompression circuit 34 to the television receiver 205 through the 1394 bus 206.

At a step S301, the 1394-interface unit 72 employed in the television receiver 205 receives the image data transmitted thereto through the 1394 bus 206, passing the data to the CPU 61. Then, the CPU 61 outputs the image data to the synthesizer 66 through the video-signal generating unit 68. Finally, the synthesizer 66 supplies the image data to the display unit 67 for displaying the image thereon. As a result, an image of the user of the portable-telephone device 301 is displayed on the display unit 67 employed in the television receiver 205.

In this way, the users of the portable-telephone devices 201 and 301 are capable of having a telephone conversation thereafter while looking at the images of their partners.

As the telephone conversation is completed at a step S108, typically, the user of the portable-telephone device 201 operates the television-telephone button 16A of the input unit 16 employed in the portable-telephone device 201. At this time, the CPU 11 controls the radio-communication unit 20 to transmit a termination-request signal to the portable-telephone base station 231-1. Receiving the termination-request signal, the portable-telephone base station 231-1 cuts off the communication line and, at the same time, transmits the signal to the portable-telephone device 301 through the portable-telephone line network 232 and the portable-telephone base station 231-2. Notified of the termination at a step S508, the user of the portable-telephone device 301 ends the telephone conversation with the user of the portable-telephone device 201. Then, at a step S509, the user of the portable-telephone device 301 operates the television-telephone button 16A of the input unit 16 employed in the portable-telephone device 301 to make a request for termination of the telephone conversation. At that time, the CPU 11 employed in the portable-telephone device 301 controls the command generating/analyzing unit 21 for driving the infrared-ray generating unit 22 to transmit the termination-request signal to the terminal adapter 302.

At a step S709, the infrared-ray receiving unit 40 employed in the terminal adapter 302 transfers the received termination-request signal to the command generating/analyzing unit 38 which then passes the signal to the CPU 31. The CPU 31 finally carries out the processing to terminate the television-telephone communication in accordance with the termination-request signal.

When the user of the portable-telephone device 301 operates the television-telephone button 16A at the step S509 as described above, the communication line between the terminal adapters 202 and 302 is released.

When the user of the portable-telephone device 201 operates the television-telephone button 16A of the input unit 16 employed in the portable-telephone device 201 to make a request for termination of the telephone conversation at the step S108 as described above, the CPU 11 employed in the portable-telephone device 201 controls the command generating/analyzing unit 21 for driving the infrared-ray generating unit 22 to transmit a termination-request signal to the terminal adapter 202 at a step S109. Then, at a step S209, the infrared-ray receiving unit 40 employed in the terminal adapter 202 transfers the received termination-request signal to the command generating/analyzing unit 38 which then passes the signal to the CPU 31. The CPU 31 finally carries out processing to terminate the television-telephone communication in accordance with the termination-request signal.

Then, at a step S210, the CPU 31 employed in the terminal adapter 202 transmits the PID of the portable-telephone device 201, the TAID of the terminal adapter 202 and a notice of the television-telephone termination to the authentication/accounting server 235 from the communication unit 37 through the OCN 233 and the Internet 234. At a step S405, the PID, the TAID and the termination notice are received by the communication unit 89 of the authentication/accounting server 235 which passes the signals to the CPU 81. Receiving the information, the CPU 81 carries out processing to terminate the television telephone. Then, the present time and date are registered in the user control table shown in FIG. 6 as a usage end time and date on the user control table and, at the same time, a television-telephone charge for the period of time between the usage start time and the usage end time is computed and registered in a column for a cumulated charge of using the television-telephone set. Later, the CPU 81 carries out processing to draw money indicated by the computed charge from a credit card, the number of which is registered in the user control table on the same line as the PID.

As described above, a request for termination of the telephone conversation is made from the portable-telephone device 201. It should be noted, however, that such a request can also be made from the portable-telephone device 301, the partner of the portable-telephone device 201 initiating the telephone conversation. In addition, in the case of a change request from the portable-telephone device 201 to the portable-telephone device 301, made from the called portable-telephone device 301, the charge of the television-telephone communication can also be billed to the portable-telephone device 301.

As described above, the user of the portable-telephone device 201 is capable of having a telephone conversation like a television-telephone conversation with the user of the portable-telephone device 301 when necessary by operating the television-telephone button 16A in the course of an ordinary telephone conversation based on audio signals.

Figure 8:
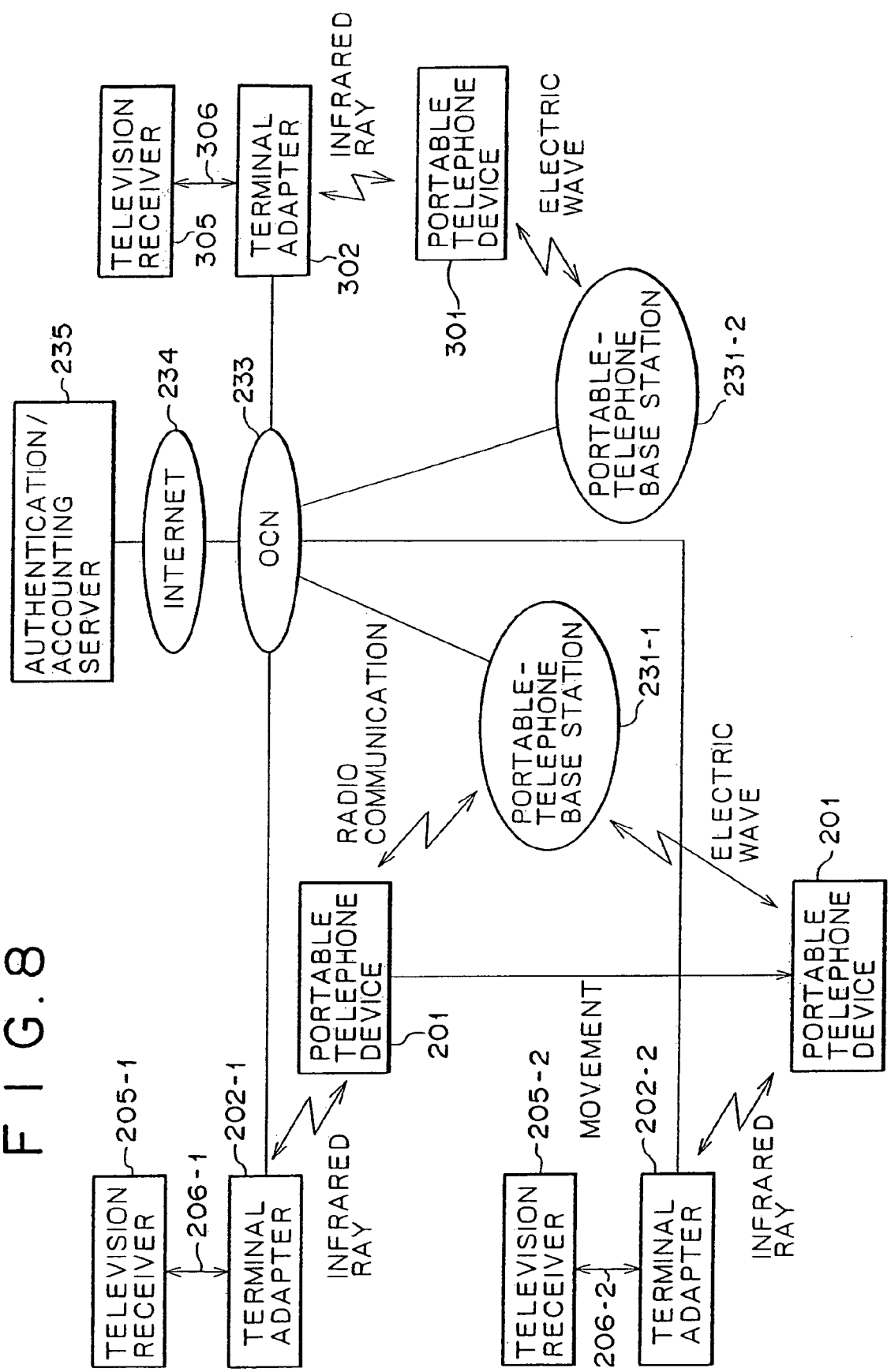
FIG. 8 is an explanatory diagram used for describing the operation of the communication system shown in FIG. 1 which is carried out when the portable telephone device 201 is moved.

In order to make the portable-telephone device 201 portable, the portable-telephone device 201 is designed to have a small size. Thus, by moving with the portable-telephone device 201 to a predetermined place where the terminal adapter 202 is installed, the user can have a television-telephone conversation with a partner. Assume that the user has a television-telephone conversation by using the portable-telephone device 201 in a room where a terminal adapter 202-1 and a television receiver 205-1 connected to each another by a 1394 bus 206-1 are installed, and moves taking along with the portable telephone device 201 to another room where another terminal adapter 202-2 and another television receiver 205-2 connected to each another by another 1394 bus 206-2 are installed as shown in FIG. 8. When moving from the former room to the latter room, the user turns off the television-telephone button 16A to temporarily suspend the television-telephone conversation, continuing a telephone conversation based on audio signals as it is. In the latter room, the user can resume the television-telephone conversation by again operating the television-telephone button 16A.

Television receivers have spread as evidenced by the fact that a plurality of sets are installed per home these days. In addition, a terminal adapter having a simple configuration can be connected to each television receiver relatively with ease. That is to say, by adding some functions to the already existing infrastructure, a television-telephone communication can be established at any desired location close to a television receiver.

As described above, a television-telephone conversation suspended at a location can be resumed at another place not only in the same building as the location but also in a different building.

Figure 9:
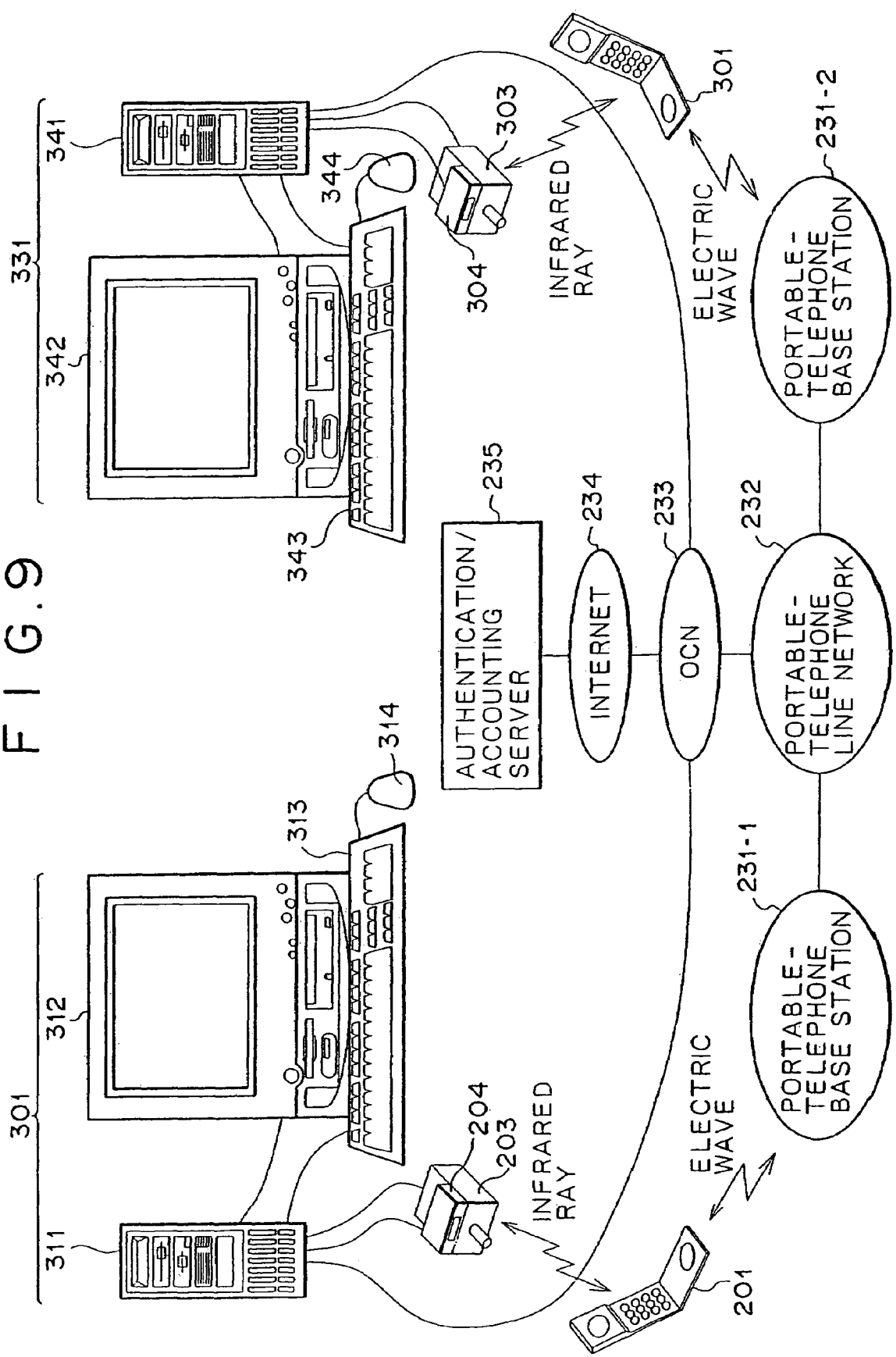
FIG. 9 is a diagram showing another typical configuration of a communication system provided by the present invention.

As described above, the terminal adapters 202 and 302 are connected to the television receivers 205 and 305 respectively. It is worth noting, however, that the terminal adapter 202 and the television receiver 205 can be replaced by a personal computer 301 as shown in FIG. 9. By the same token, the terminal adapter 302 and the television receiver 305 can be replaced by a personal computer 331. In this case, the personal computer 301 comprises a main body 311, a display unit 312, a keyboard 313 and a mouse 314 the main body 311 is connected to a video camera 203 and an infrared-ray communication unit 204. By the same token, the personal computer 331 comprises a main body 341, a display unit 342, a keyboard 343 and a mouse 344 the main body 341 is connected to a video camera 303 and an infrared-ray communication unit 304.

Figure 10:
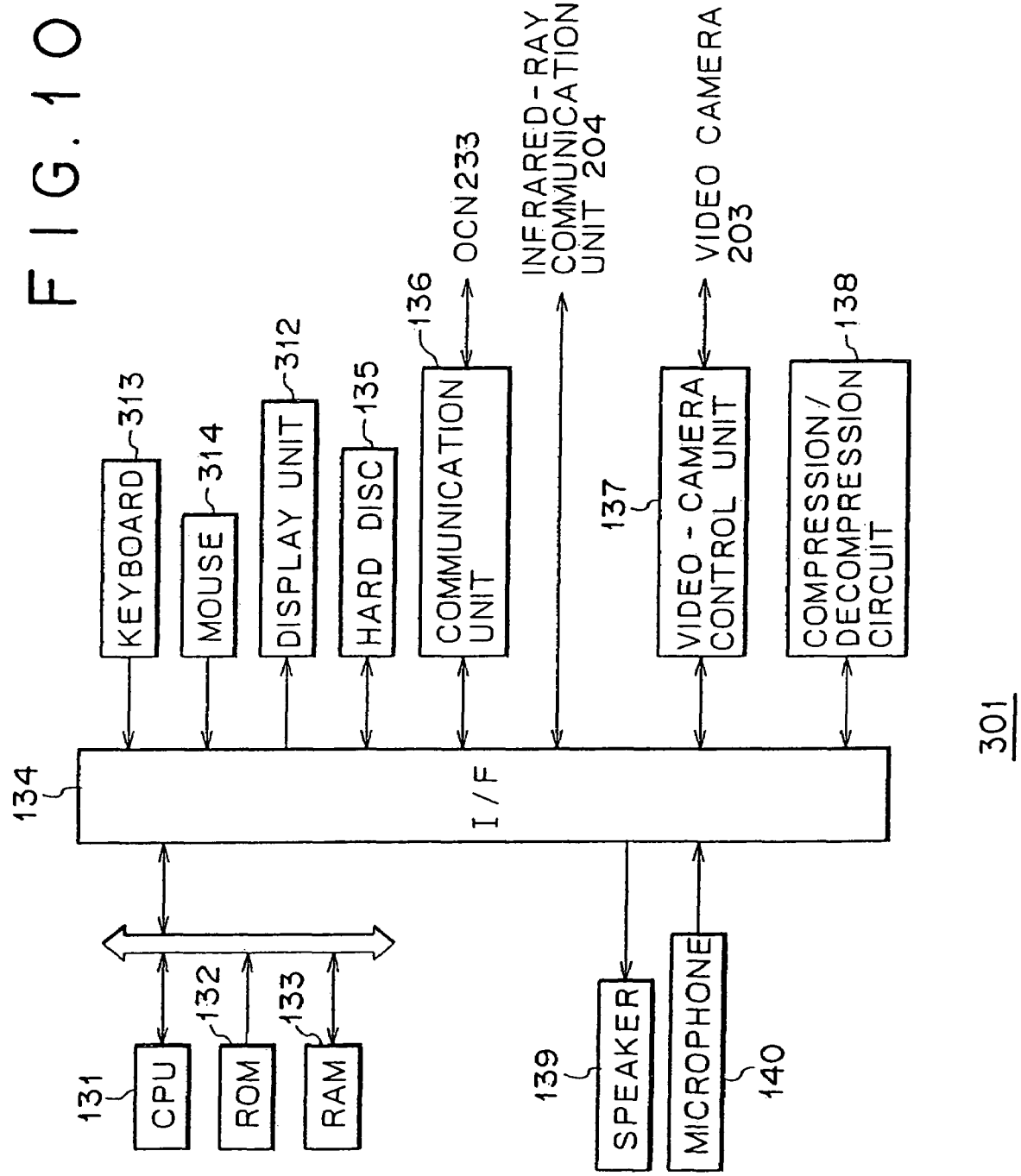
FIG. 10 is a block diagram showing a typical internal configuration of a personal computer 301 used in the communication system shown in FIG. 9.

The personal computer 301 which is also used for television-telephone communication typically has a configuration like one shown in FIG. 10. Since the personal computer 331 has the same configuration as the personal computer 301, the personal computer 331 is not shown in a figure.

In the typical configuration shown in FIG. 10, a CPU 131 carries out various kinds of processing by execution of programs stored in a ROM 132. A RAM 133 is used for properly storing data and programs required by the CPU 131 in carrying out the processing. The keyboard 313 and the mouse 314 are operated by the user for entering a variety of commands to be supplied to the CPU 131 by way of the interface unit 134. On the display unit 312, characters and images are properly displayed. A hard disc 135 is used for storing the ID of the personal computer 301. A communication unit 136 carries out communication with the OCN 233. A video-camera control unit 137 controls the video camera 203 to take an image of the user and outputs the image to a compression/decompression circuit 138 for compressing image data picked up by the video camera 203 and decompressing image data supplied thereto by the communication unit 136. A speaker 139 outputs an audio signal whereas a microphone 140 picks up an audio signal. An interface unit 134 serves as an interface between the CPU 131 and components; the display unit 312, the keyboard 313, the mouse 314, the hard disc 135, the communication unit 136, the video-camera control unit 137, the compression/decompression circuit 138, the speaker 139 the microphone 140 and the infrared-ray communication unit 204.

The portable-telephone line network 232 described above is a network of the so-called connection-type communication lines in which the two users of the portable-telephone devices 201 and 301 occupy one telephone line. On the another hand, the OCN 233 comprises the so-called connectionless-type communication lines used by a number of users at the same time instead of being occupied by the two users of the portable-telephone devices 201 and 301. That is to say, in the communication system shown in FIG. 1, connection-type communication lines of the portable-telephone line network 232 are used for communicating IP addresses as access information required for communicating image data as main information. The image data itself is communicated by using connectionless-type communication lines of the OCN 233.

Figure 11:
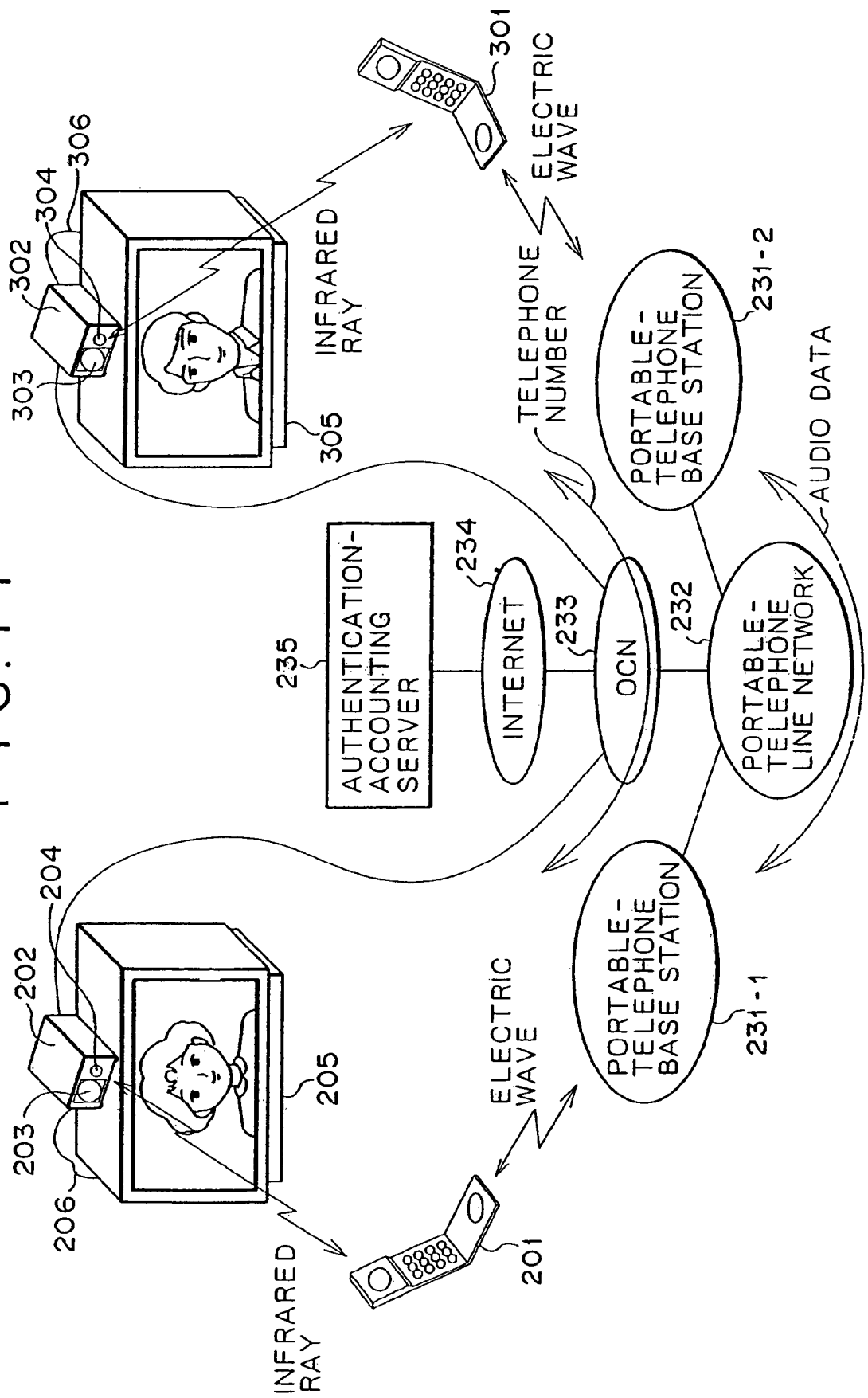
FIG. 11 is a diagram showing another typical configuration of a communication system provided by the present invention.

In a communication system like one shown in FIG. 11, on the another hand, typically, image data is communicated between the terminal adapters 202 and 203 through the OCN 233 initially. With such a communication of image data established, telephone numbers of communication partners, that is, the portable-telephone devices 201 and 301, can be communicated through the OCN 233 whereas audio data serving as main information is communicated by way of the portable-telephone line network 232. In this case, the television-telephone button 16A of the input unit 16 employed in the portable telephone device 201 shown in FIG. 2 is provided on the input unit 43 of the terminal adapter 202.

Figure 12:
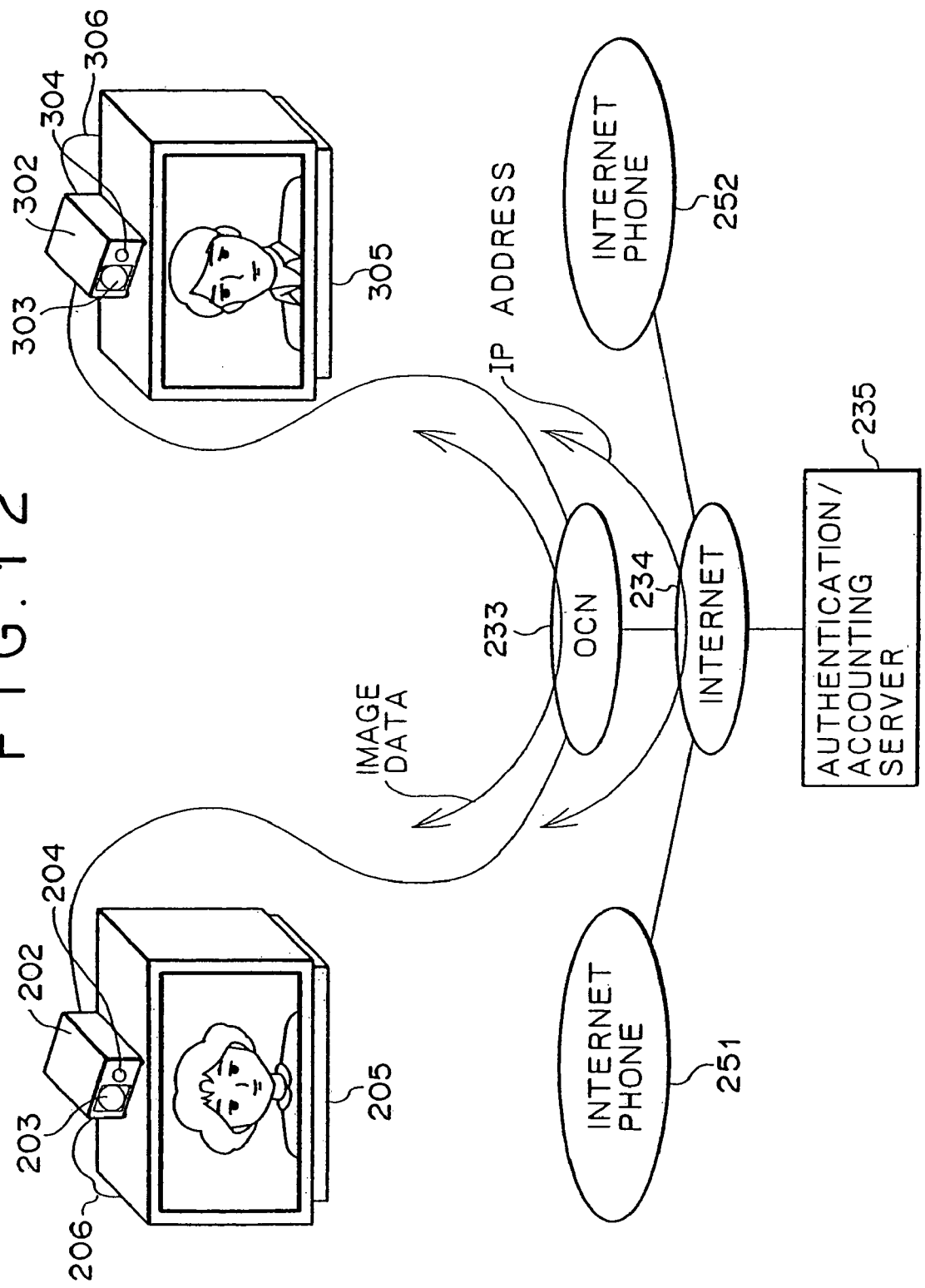
FIG. 12 is a diagram showing another typical configuration of a communication system provided by the present invention.

Assume that a television-telephone conversation becomes necessary during the communication based on audio signals through the Internet 234 between Internet phones 251 and 252 in a communication system shown in FIG. 12. In this case, the IP addresses of the terminal adapters 202 and 302 can be communicated through the Internet 234 between the Internet phones 251 and 252 and, when the IP addresses are received, image data can be exchanged as main information through the OCN 233 between the terminal adapters 202 and 302. In such communication, IP addresses and image data are both communicated by using connectionless-type communication lines as access information and main information respectively.

Figure 13:
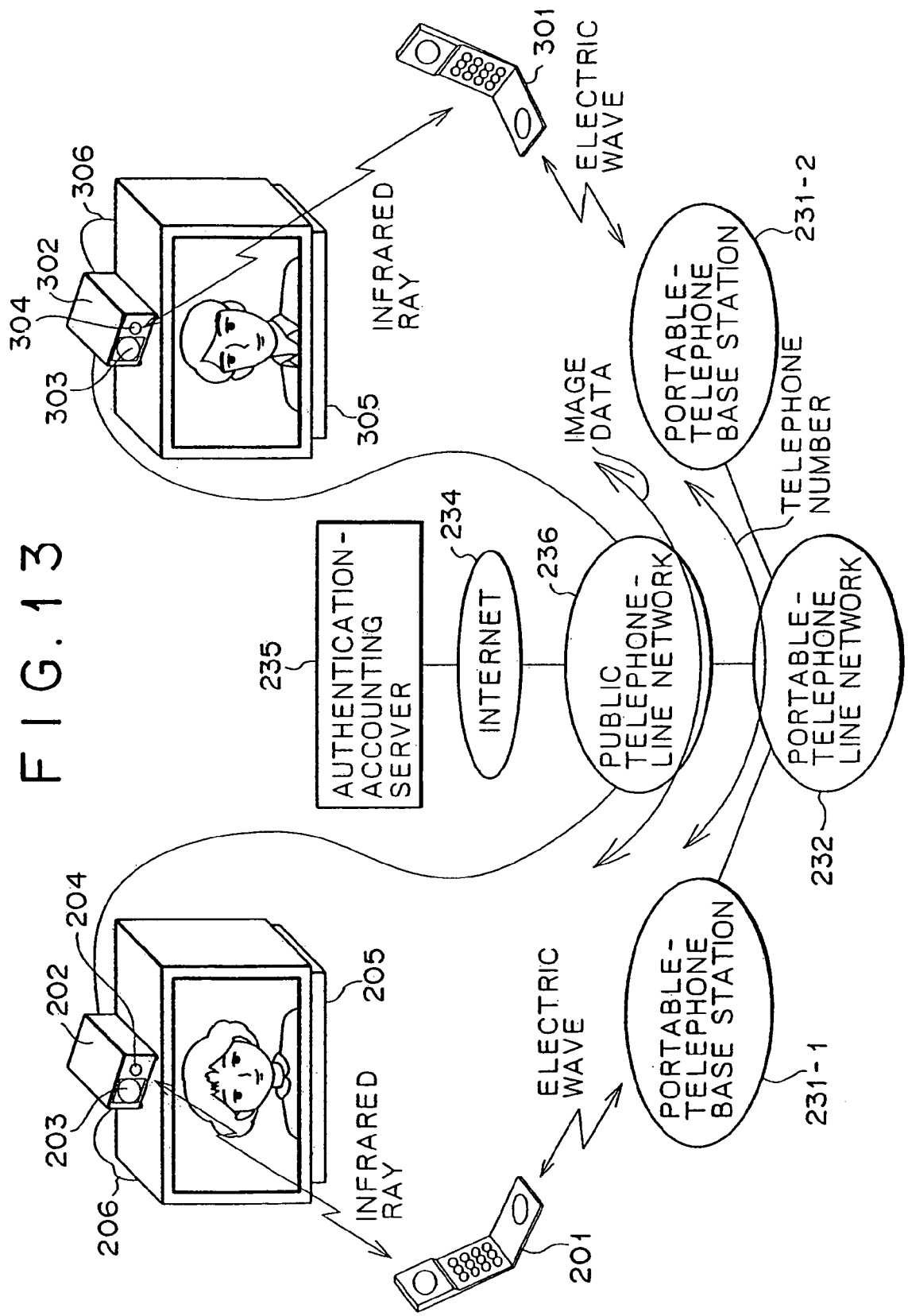
FIG. 13 is a diagram showing another typical configuration of a communication system provided by the present invention.

In a communication system shown in FIG. 13, image data is exchanged between the terminal adapters 202 and 302 by using a public telephone-line network 236. In this case, the telephone numbers of the terminal adapters 202 and 302 can be communicated between the portable-telephone devices 201 and 301 through the portable-telephone line network 232 and, by using the telephone numbers, image data can be communicated between the terminal adapters 202 and 302 as main information. In such a communication system, the telephone numbers and image data are both communicated by using connection-type communication lines as access information and main information respectively.

Figure 14:
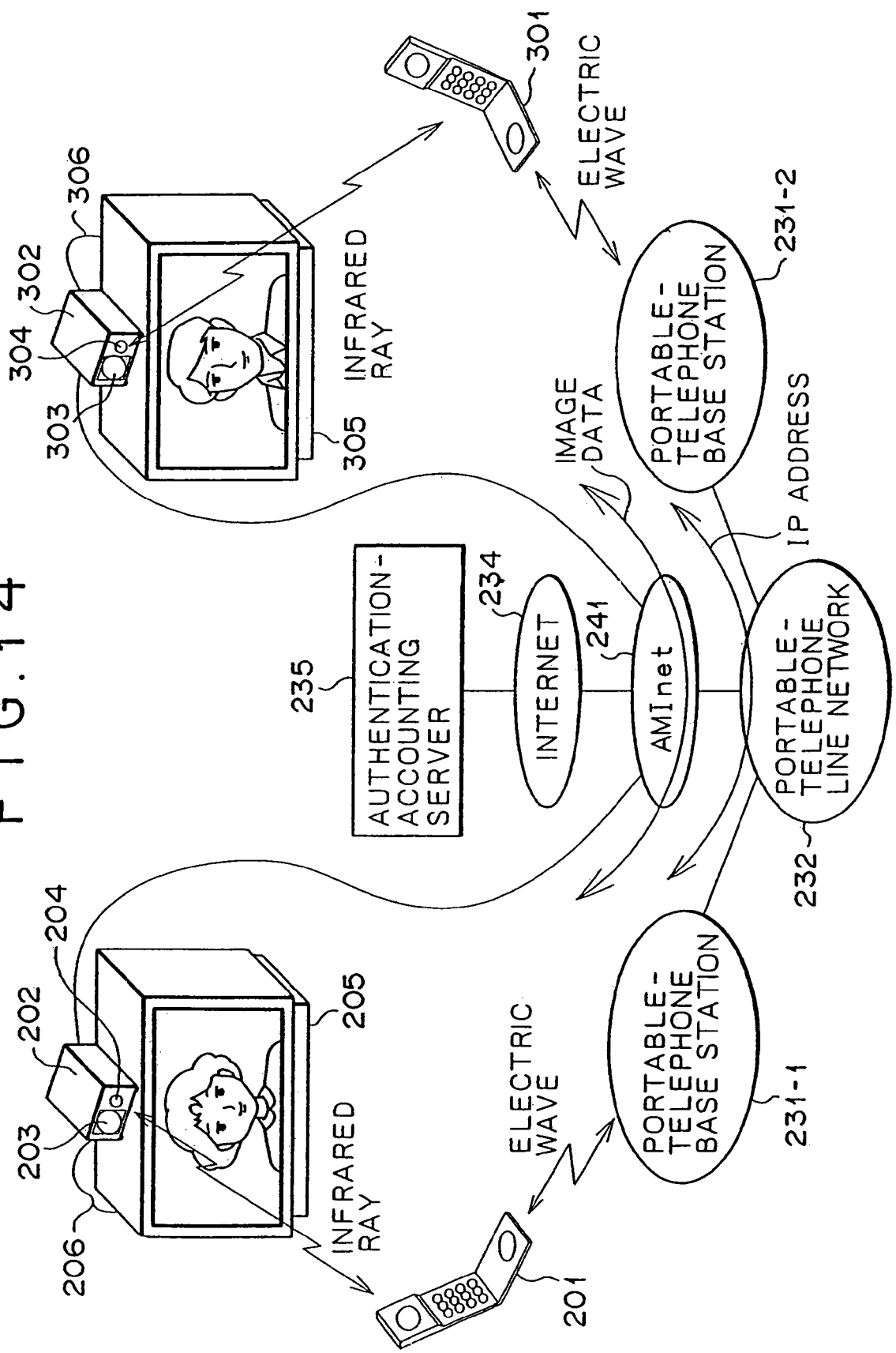
FIG. 14 is a diagram showing another typical configuration of a communication system provided by the present invention.

In a communication system shown in FIG. 14, image data is communicated, as main information through a communication network 241 called AMInet only in this specification. The AMInet comprises connection-type communication lines. In this case, the required access information is IP addresses instead of telephone numbers. Between portable-telephone devices 201 and 301 in such a communication system, IP addresses are communicated through the portable-telephone line network 232 whereas resource-reservation information of an ASP (AMInet Set-up Protocol) is communicated through the AMInet 241. After these communications, image data is communicated as main information between the terminal adapters 202 and 302. The ASP is a resource reservation protocol in the AMInet. In this communication system, communication lines are connection-type communication lines.

The AMInet is a network having a large transmission capacity and a high transmission speed over a large range wherein a reservation for preserving a band can be made and a QOS (Quality of Service) is assured. In this example, such features can be implemented. For details, refer to Japanese Patent Application No. Hei9-279826 of the assignee of the present invention and corresponding to U.S. patent application Ser. No. 08/160472 field on Sep. 24, 1998 or a reference authored by Atsushi Shionozaki, Yasutaka Miwa and Fumio Teraoka with a title of "Implementation of Real-Time Communication by Integration of ATMs and IPs in the AMInet" submitted as part of a collection of theses presented to the forteenth conference of the Japan Software Academic Society, the September and October numbers, 1997.

It should be noted that, as a PID described above, a caller_ID can be used. A caller_ID is the telephone number of the call originator which is used in a service of displaying the telephone number of the call originator or information prior to communication. In this case, caller_ids stored in the EEPROMs 14 of the portable-telephone devices 201 and 301 are used in place of the personal IDs described above. In addition, a portable-telephone device of any type can be used.

As described above, video or audio data is used as main information of communication. It should be noted that the present invention can also be applied to a case in which another data is communicated as main information. In addition, the present invention can also be applied to a case in which a simplex communication line is used as a communication line for transmitting main information.

As described above, according to the embodiment of the present invention, by merely adding a minimum facility to a communication apparatus such as a portable telephone device for use by the user to have a traditional telephone conversation based on voice, an extended function of a television-telephone set for use by the user to have a television-telephone conversation by looking at an image of the partner can be implemented in a simple and low-cost configuration. As a result, the user is capable of using the function of a television-telephone set at any place by visiting for example any of stores selling home electrical appliances at which a large number of television receivers and VTRs of the integrated-camera type are displayed. It is thus possible to implement the so-called ubiquitous communicator. In addition, if such appliances are displayed in a store also as resources of society, they can also be put into effective use.

Furthermore, since it is not necessary to provide the communication apparatus itself such as a portable telephone device with components such as a CCD camera, a liquid crystal display device and an image compressing/decompressing circuit, it is possible to avoid factors serving as a hindrance to portability such as increases in apparatus size and weight.

It should be noted that presentation media for presenting a computer program to be executed for carrying out the processing described above include communication media such as a network and a satellite in addition to recording media like a magnetic disc, a CD-ROM and a solid-state memory.

What is claimed is:

1. An information processing apparatus comprising:
a first communicator to communicate with a portable communication device through a first communication link, and
a second communicator to communicate with another information processing apparatus through a second communication link that is not routed through said portable communication device, the first communicator obtains address information of said another information processing apparatus to establish the second communication link via said second communicator, and the information processing apparatus is in communication with the another information processing apparatus through the second communication link,
wherein the first communication link has a range that is shorter than the range of the second communication link.

2. A communication method for communicating with another information communication apparatus including a first communicator that communicates with a portable communication device through a first communication link, and a second communicator that communicates with another information processing apparatus comprising steps of:
at said first communicator, obtaining address information of said another information processing apparatus to establish a second communication link via said second communicator that is not routed through said portable communication device, and
at said second communicator, communicating with said another information processing apparatus via the second communication link based on said address information,
wherein the first communication link has a range that is shorter than the range of the second communication link.

3. A non-tangible computer-readable medium having recorded thereon a program for implementing a communication method for communicating with another information communication apparatus including a first communicator that communicates with a portable communication device through a first communication link, and a second communicator that communicates with another information processing apparatus, said method comprising the steps of:
at said first communicator, obtaining address information of said another information processing apparatus to establish a communication link via said second communicator that is not routed through said portable communication device, and
at said second communicator, communicating with said another information processing apparatus via the second communication link based on said address information,
wherein the first communication link has a range that is shorter than the range of the second communication link.

4. The information processing apparatus of claim 1, wherein the first communication link is infrared and the second communication link is through the Internet.

5. The information processing method of claim 2, wherein the first communication link is infrared and the second communication link is through the Internet.

6. The computer-readable medium of claim 3, wherein the first communication link is infrared and the second communication link is through the Internet.

7. The information processing apparatus of claim 4, wherein the first communicator is enabled to receive data other than voice data of the portable communication device and the second communicator is enabled to send the data other than voice data over the second communication link.

8. The information processing method of claim 5, wherein the first communicator enabled to receive data other than voice data of the portable communication device and the second communicator is enabled to send the data other than voice data over the second communication link.

9. The computer readable medium of claim 6, wherein the first communicator enabled to receive data other than voice data of the portable communication device and the second communicator is enabled to send the data other than voice data over the second communication link.

* * * * *